(12) United States Patent
Zhang et al.

(10) Patent No.: US 11,194,391 B2
(45) Date of Patent: Dec. 7, 2021

(54) VISUAL ARTIFACT MITIGATION OF DYNAMIC FOVEATED DISPLAYS

(71) Applicant: Apple Inc., Cupertino, CA (US)

(72) Inventors: Sheng Zhang, San Jose, CA (US); Chaohao Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/644,920

(22) PCT Filed: Aug. 30, 2018

(86) PCT No.: PCT/US2018/048921
§ 371 (c)(1),
(2) Date: Mar. 5, 2020

(87) PCT Pub. No.: WO2019/067157
PCT Pub. Date: Apr. 4, 2019

(65) Prior Publication Data
US 2021/0141449 A1 May 13, 2021

Related U.S. Application Data

(60) Provisional application No. 62/564,136, filed on Sep. 27, 2017.

(51) Int. Cl.
*G06F 3/01* (2006.01)
*G09G 3/20* (2006.01)

(52) U.S. Cl.
CPC .............. *G06F 3/013* (2013.01); *G09G 3/20* (2013.01); *G09G 2340/0407* (2013.01); *G09G 2354/00* (2013.01)

(58) Field of Classification Search
CPC ........ G06F 3/013; G09G 3/20; G09G 3/2018; G09G 2340/0407; G09G 2354/00; G09G 2320/02; G09G 2320/0247; G09G 2320/0266; G09G 2320/0257
See application file for complete search history.

(56) References Cited

U.S. PATENT DOCUMENTS

| 7,372,457 | B2 * | 5/2008 | Wang ..................... G09G 5/005 345/204 |
| 9,529,191 | B2 | 12/2016 | Sverdrup et al. |
| 2001/0033287 | A1 | 10/2001 | Naegle et al. |
| 2008/0143729 | A1 * | 6/2008 | Wyatt ..................... G09G 5/18 345/501 |

(Continued)

FOREIGN PATENT DOCUMENTS

| WO | 2017036429 S2 | 3/2017 |
| WO | 2017094002 A1 | 6/2017 |

*Primary Examiner* — Mihir K Rayan
(74) *Attorney, Agent, or Firm* — Fletcher Yoder, P.C.

(57) ABSTRACT

The present disclosure relates to electronic devices that include displays that show dynamic foveated content. For example, portions of the content may be shown in different resolutions on different areas of the display based on a user's gaze that can be monitored with an eye tracker. Based on eye tracking data collected by the eye tracker, a processor of the electronic device may stop or slow the transmission of pixel data associated with one or more frames of the content. Additionally, the processor may generate pixel data such that the display may gradually transition from employing dynamic foveation to employing static foveation.

20 Claims, 14 Drawing Sheets

(56) References Cited

U.S. PATENT DOCUMENTS

| | | | |
|---|---|---|---|
| 2009/0021457 A1 | 1/2009 | Weitbruch et al. | |
| 2013/0083043 A1* | 4/2013 | Carter | G06T 1/20 |
| | | | 345/506 |
| 2015/0277123 A1 | 10/2015 | Chaum et al. | |
| 2016/0267716 A1* | 9/2016 | Patel | G09G 5/373 |
| 2017/0206410 A1 | 7/2017 | Kuldkepp et al. | |
| 2017/0219833 A1 | 8/2017 | Mayama et al. | |
| 2017/0236466 A1* | 8/2017 | Spitzer | G09G 3/3275 |
| | | | 345/560 |
| 2017/0285736 A1* | 10/2017 | Young | G06F 3/013 |
| 2017/0287446 A1* | 10/2017 | Young | G06F 3/013 |
| 2018/0284451 A1* | 10/2018 | Eash | G06F 3/011 |
| 2021/0096644 A1* | 4/2021 | Wang | G09G 3/2044 |
| 2021/0174768 A1* | 6/2021 | Jarvenpaa | G06F 3/012 |

\* cited by examiner

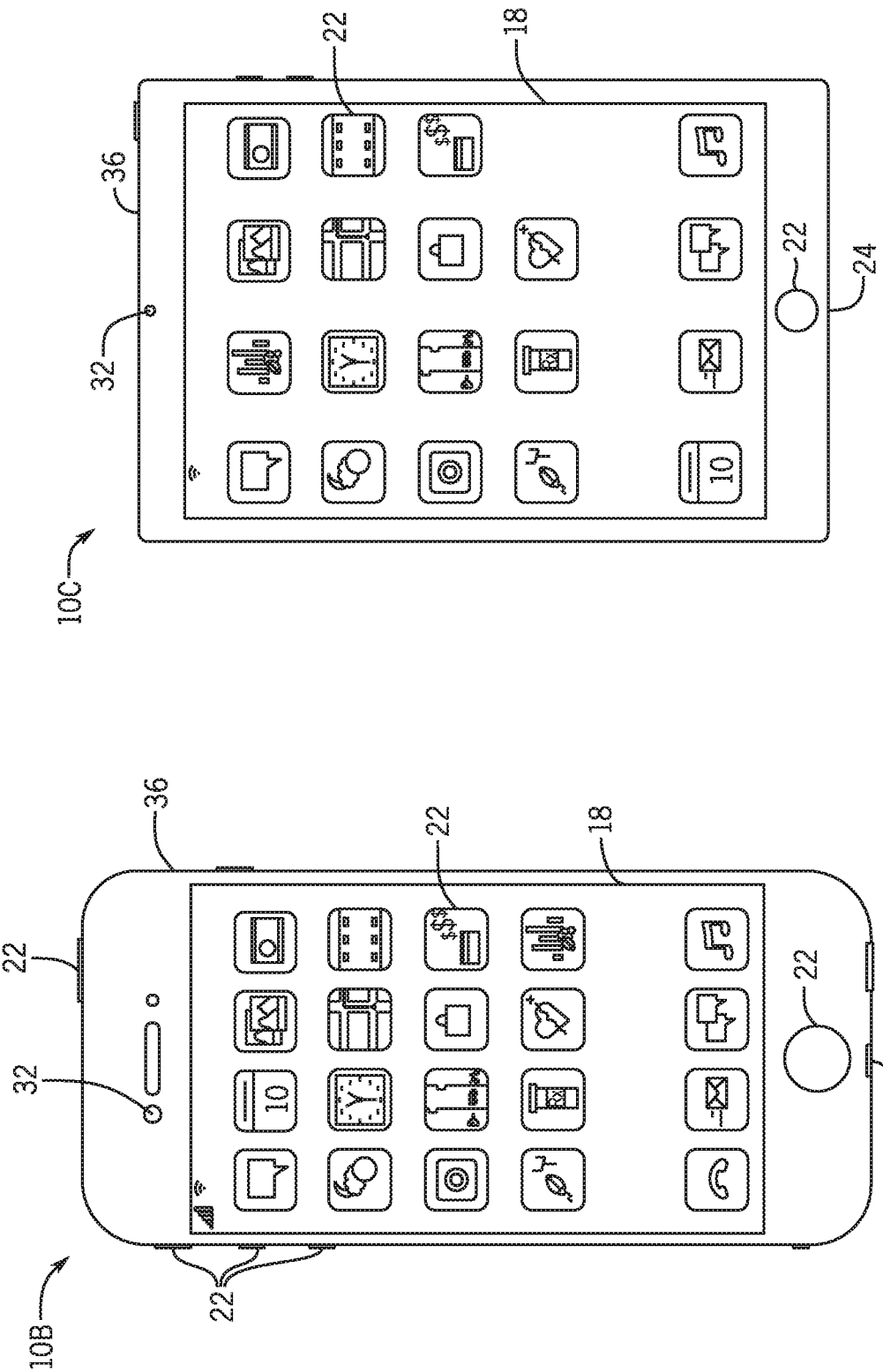

VISUAL ARTIFACT MITIGATION OF DYNAMIC FOVEATED DISPLAYS

CROSS-REFERENCE TO RELATED APPLICATIONS

This application is a 371 Non-Provisional patent application of PCT Application No. PCT/US2018/048921 filed Aug. 30, 2018, which claims benefit of U.S. Provisional Patent Application No. 62/564,136, entitled "VISUAL ARTIFACT MITIGATION OF DYNAMIC FOVEATED DISPLAYS", filed Sep. 27, 2017, which is herein incorporated by reference in its entirety and for all purposes.

BACKGROUND

The present disclosure relates generally to mitigating visual artifacts associated with electronic displays. More specifically, the present disclosure is directed to mitigating visual artifacts that may occur when dynamic foveation is performed.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—such as televisions, portable phones, computers, wearable devices, vehicle dashboards, virtual-reality glasses, and more—include electronic displays. In some cases, electronic displays may show images or frames of content such as photographs, videos, and video games in a foveated manner. Foveation refers to a technique in which the amount of detail or resolution is varied across an image based on a fixation point, such as a point or area within the image itself, a point or region of the image on which a viewer's eyes are focused, or based on the gaze movement of the viewer's eyes. More specifically, the amount of detail can be varied by using different resolutions in various portions of an image. For instance, in one area of an electronic display, one pixel resolution may be used to display one portion of an image, whereas a lower or higher pixel resolution may be used to display another portion of the image in another area of the electronic display.

In dynamic foveation, the areas of the electronic display at which the various resolutions are used may change between two or more images based on the viewer's gaze. For example, in content that uses multiple images, such as videos and video games, the content may be presented to viewers by displaying the images in rapid succession. The portions of the screen in which the content is displayed with a relatively high and low resolutions may change. For instance, when viewing a first image in a video, the viewer's eyes may be focused on something in the image that is displayed in the top left corner of the electronic display. Because the viewer's eyes are focused on the top left corner, the top left corner of the electronic display may present the content with a higher resolution than the other areas of the display. However, the viewer's eyes may then focus on another portion of the electronic display such as the bottom left corner. A subsequent image of the content to be displayed may then have a higher resolution in the bottom left corner, and the resolution in other portions of the electronic display will be lower.

As the areas of the electronic displays in which high resolution and lower resolutions occur change, visual artifacts may occur. For example, the human eye may perceive flickering on the electronic display. Moreover, visual artifacts can also occur when an electronic device on which the electronic display is included loses track of the location on the electronic display at which a viewer's eye are focused.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to systems and methods for reducing visual artifacts of electronic displays that can occur due to dynamic foveation. For example, in electronic displays such as liquid crystal displays (LCDs), light-emitting diode (LED) displays, and other types of displays, visual artifacts may occur due to changing the resolution of portions of displays over time during dynamic foveation. Additionally, visual artifacts may also occur when an electronic device that includes an electronic display stops tracking the eyes of a user of the electronic device. Visual artifacts that remain on a display may be referred to as image retention, image persistence, sticking artifacts, and/or ghost images. Additionally, visual artifacts may cause an image to appear to the human eye to remain on a display for a period of time after the image content is no longer being provided by the electronic display. For instance, the human eye may perceive that one frame of content is being displayed on a display when the display is actually showing a later frame of the content.

Accordingly, to reduce and/or eliminate visual artifacts, in some embodiments, intra-frame pauses in illuminating pixels of an electronic display may be performed. More specifically, based on eye tracking data collected by an eye tracker, a processor of the electronic device may stop or slow the transmission of pixel data associated with one or more frames of the content. In other embodiments, a display may gradually transition from employing dynamic foveation to employing static foveation (i.e., displaying content in a manner in which the size and location of various resolution areas on the display are fixed). Implementing intra-frame pausing and/or gradually transitioning to employing static foveation causes a change in strobe cadence between frames such that the strobe cadence does not result in image artifacts that are perceivable to the human eye. Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1;

FIG. 4 is a front view of another hand-held device representing another embodiment of the electronic device of FIG. 1;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
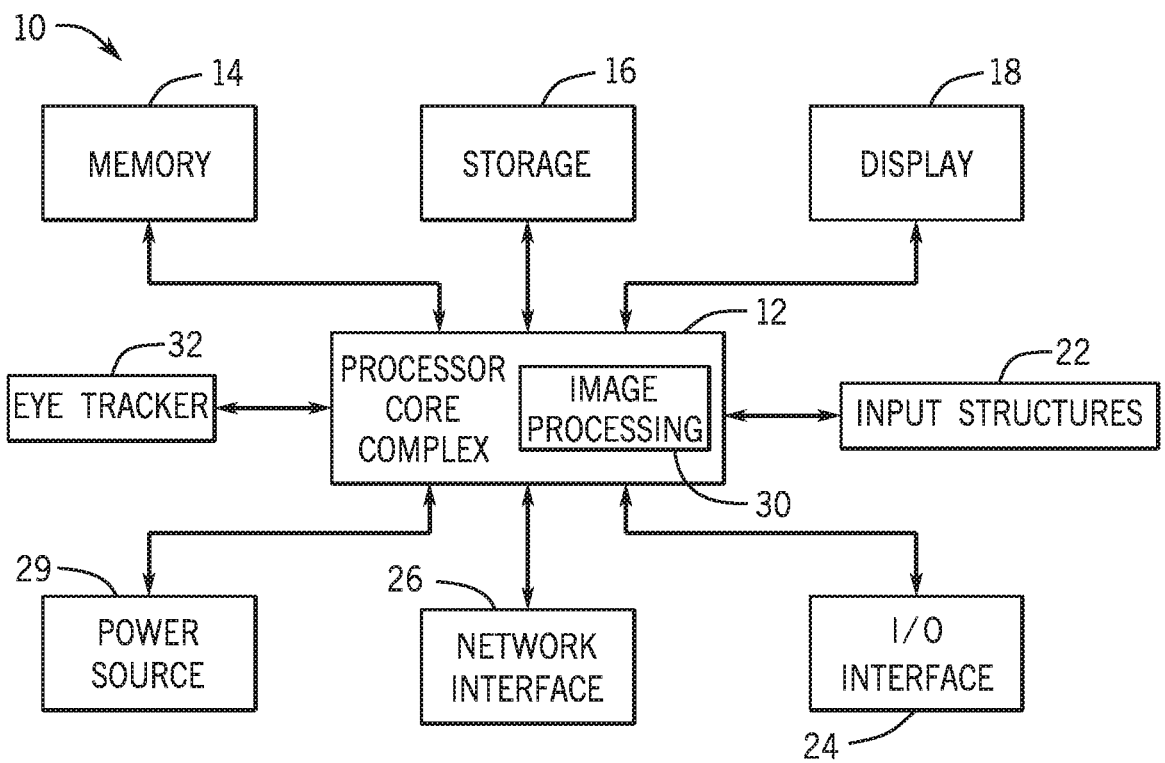
FIG. 1 is a block diagram of an electronic device with an electronic display, in accordance with an embodiment.
Figure 2:
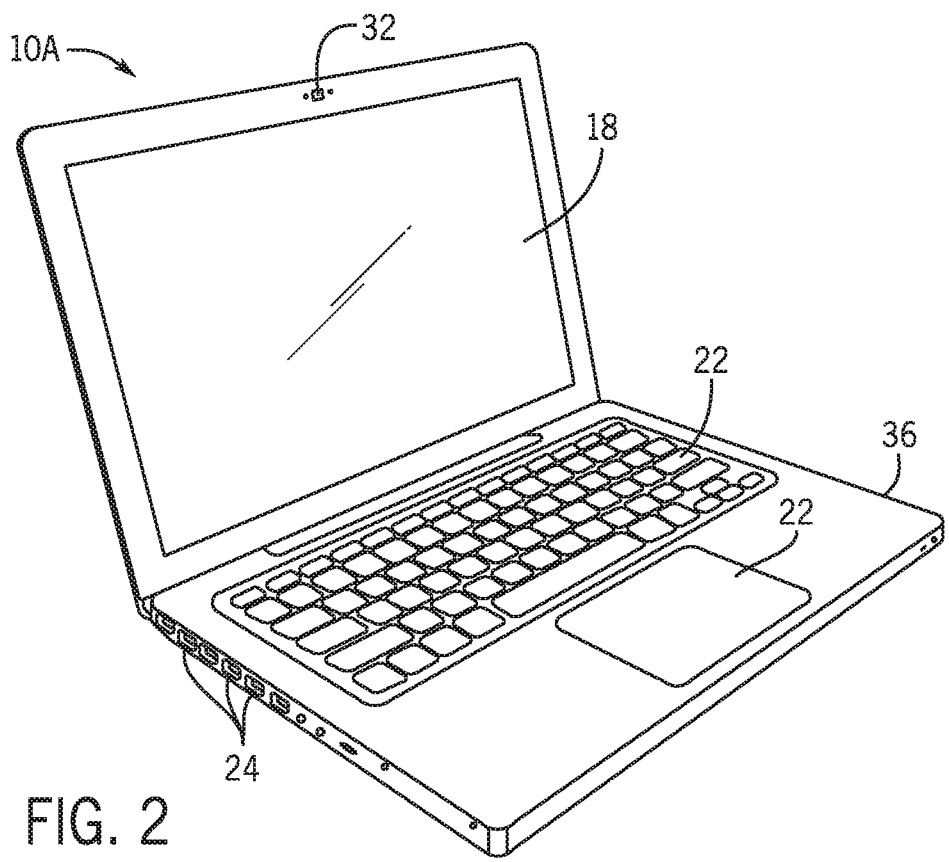
FIG. 2 is a perspective view of a notebook computer representing an embodiment of the electronic device of FIG. 1.
Figure 5:
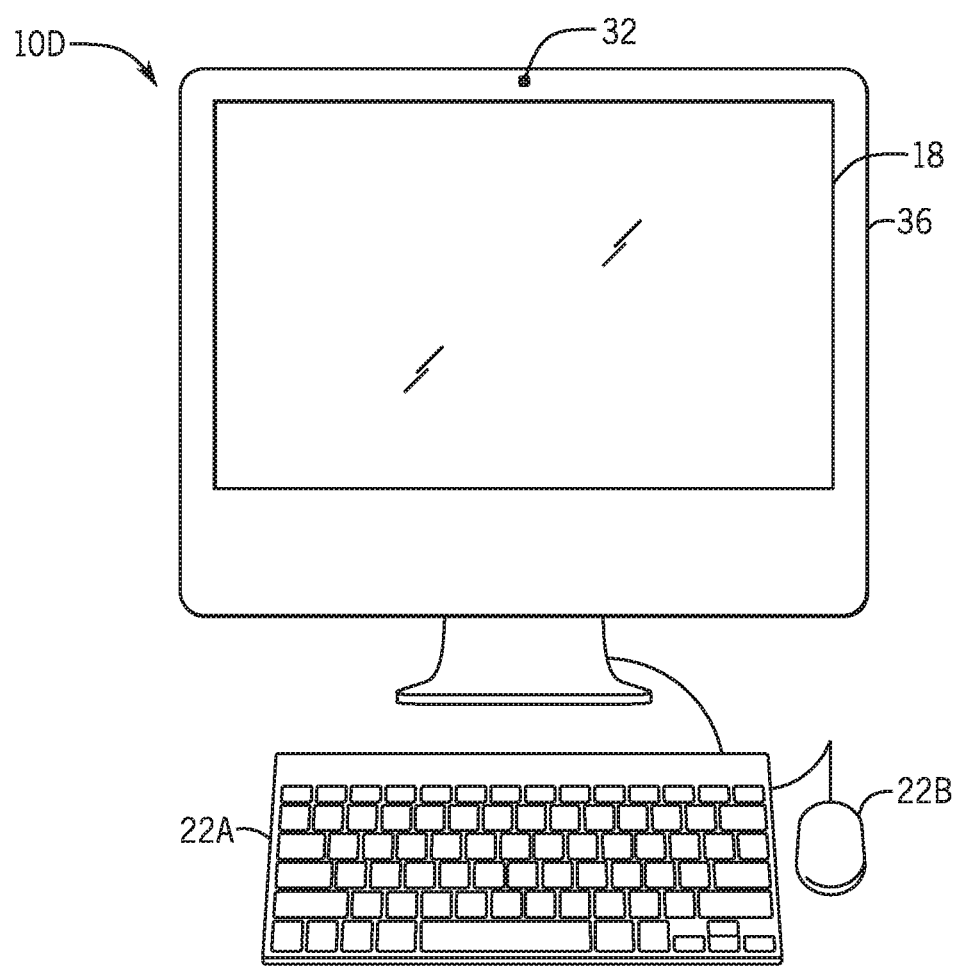
FIG. 5 is a front view of a desktop computer representing another embodiment of the electronic device of FIG. 1.
Figure 6:
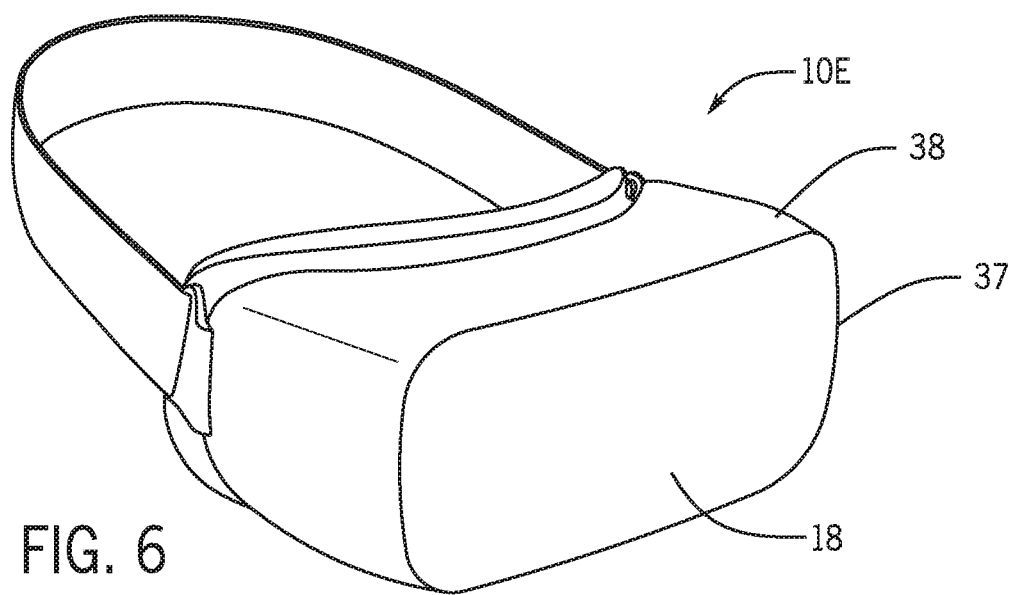
FIG. 6 is a perspective view of a wearable electronic device representing another embodiment of the electronic device of FIG. 1.

With this in mind, a block diagram of an electronic device 10 is shown in FIG. 1 that may mitigate visual artifacts, such as visual artifacts that occur due to dynamic foveation. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or any suitable similar device.

The electronic device 10 shown in FIG. 1 may include, for example, a processor core complex 12, a local memory 14, a main memory storage device 16, an electronic display 18, input structures 22, an input/output (I/O) interface 24, a network interface 26, a power source 29, and an eye tracker 32. Moreover, image processing 30 may prepare image data from the processor core complex 12 for display on the electronic display 18. Although the image processing 30 is shown as a component within the processor core complex 12, the image processing 30 may represent any suitable hardware or software that may occur between the initial creation of the image data and its preparation for display on the electronic display 18. Thus, the image processing 30 may be located wholly or partly in the processor core complex 12, wholly or partly as a separate component between the processor core complex 12 and the electronic display 18, or wholly or partly as a component of the electronic display 18.

The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For instance, the local memory 14 and the main memory storage device 16 may be included in a single component.

The processor core complex 12 may carry out a variety of operations of the electronic device 10, such as generating image data to be displayed on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diode (OLED) display, an LED display, or μLED display, or may be a liquid crystal display (LCD) illuminated by a backlight. In some embodiments, the electronic display 18 may include a touch screen, which may allow users to interact with a user interface of the electronic device 10. Additionally, the electronic display 18 may show foveated content.

The input structures 22 of the electronic device 10 may enable a user to interact with the electronic device 10 (e.g., pressing a button or icon to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 29 may include any suitable source of power, such as a rechargeable lithium polymer (Li-poly) battery and/or an alternating current (AC) power converter.

The eye tracker 32 may measure positions and movement of one or both eyes of someone viewing the display 18 of the electronic device 10. For instance, the eye tracker 32 may be a camera that can record the movement of a viewer's eyes as the viewer looks at the display 18. However, several different practices may be employed to track a viewer's eye movements. For example, different types of infrared/near infrared eye tracking techniques such as bright-pupil tracking and dark-pupil tracking may be utilized. In both of these types of eye tracking, infrared or near infrared light is reflected off of one or both of the eyes of the viewer to create corneal reflections. A vector between the center of the pupil of the eye and the corneal reflections may be used to determine a point on the display 18 at which the viewer is looking. Moreover, as discussed below, varying portions of the display 18 may be used to show content in high and low resolution portions based on where a viewer's eyes are looking on the display 18.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18. Additionally, the computer 10A may also include an eye tracker 32, such as a camera.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol. Moreover, the handheld device 10B may include an eye tracker 32.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif. As with the handheld device 10B, the handheld device 10C may also include an eye tracker 32.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D. Furthermore, the computer 10D may include an eye tracker 32.

Similarly, FIG. 6 depicts a wearable electronic device 10E representing another embodiment of the electronic device 10 of FIG. 1 that is configured to operate using the techniques described herein. By way of example, the wearable electronic device 10E may be virtual reality glasses. However, in other embodiments, the wearable electronic device 10E may include other wearable electronic devices such as augmented reality glasses. The electronic display 18 of the wearable electronic device 10E may be visible to a user when the user is wearing the wearable electronic device 10E. Additionally, while the user is wearing the wearable electronic device 10E, an eye tracker of the wearable electronic device 10E may track the movement of one or both of the user's eyes. In some instances, the handheld device 10B may be used in the wearable electronic device 10E. For instance, a portion 37 of a headset 38 of the wearable electronic device 10E may allow a user to secure the handheld device 10B into place and use the handheld device 10B to view virtual reality content.

Figure 7A:
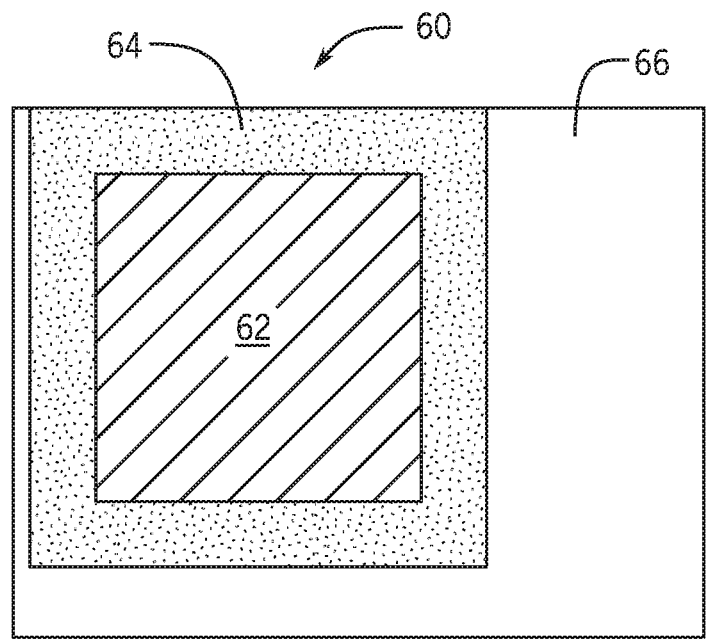
FIG. 7A is a diagram of the display of FIG. 1 in which static foveation is utilized, in accordance with an embodiment.

The display 18 of the electronic device 10 may display content in foveated regions. In other words, the resolution of the content shown on the display 18 may differ at various portions of the display 18. For instance, FIG. 7A is a diagram 60 representative of the display 18 utilizing static foveation. In static foveation, the size and location of the various resolution areas of the display 18 are fixed. In the illustrated embodiment, the display 18 includes a high resolution area 62, a medium resolution area 64, and a low resolution area 66. However, in other embodiments, there may be two or more foveated regions (e.g., a high resolution area and a lower resolution area).

Figure 7B:
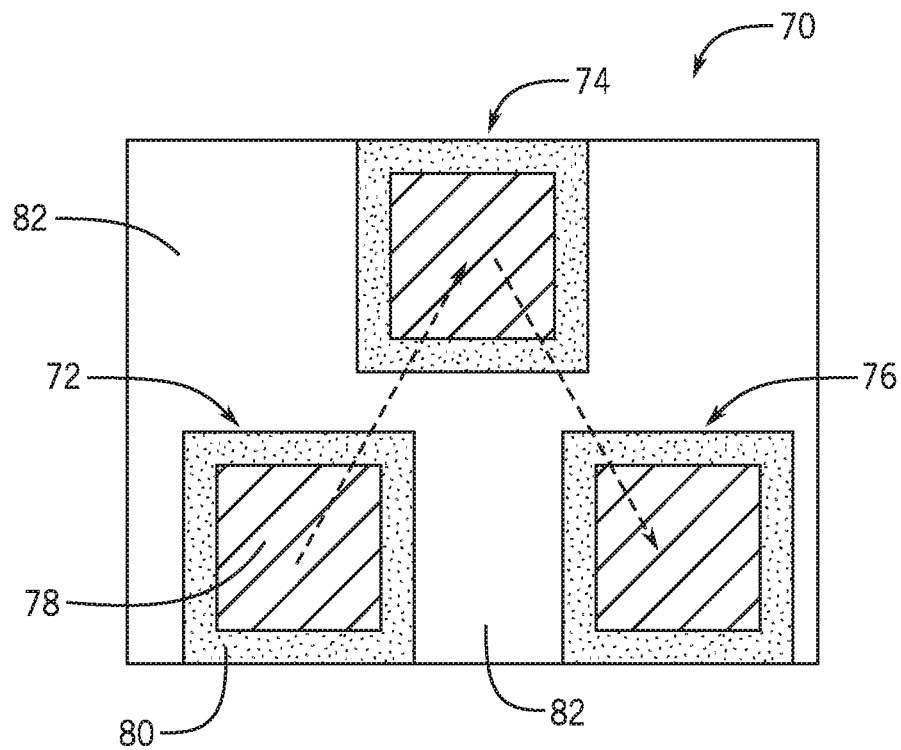
FIG. 7B is a diagram of the display of FIG. 1 in which dynamic foveation is utilized, in accordance with an embodiment.

As described above, electronic displays such as the display 18 may also use dynamic foveation. That is, the display 18 may change the size and/or location of the various resolution areas, typically based on changes in the viewer's gaze. FIG. 7B shows a diagram 70 that illustrates portions of the display 18 associated with a first frame of content 72, a second frame of content 74, and a third frame of content 76. For each of the frames 72, 74, 76, a high resolution area 78, medium resolution area 80, and low resolution area 82 are utilized. During a transition from the first frame 72 to the second frame 74, the high resolution area 78 and medium resolution area 80 shift from being positioned near the bottom left corner of the display 18 to the top central part of the display 18 as the viewer's gaze similarly shifts. Similarly, the high resolution and medium resolution areas 78 and 80 shift towards the bottom right corner of the display 18 with the viewer's gaze when the third frame 76 is displayed.

Figure 8:
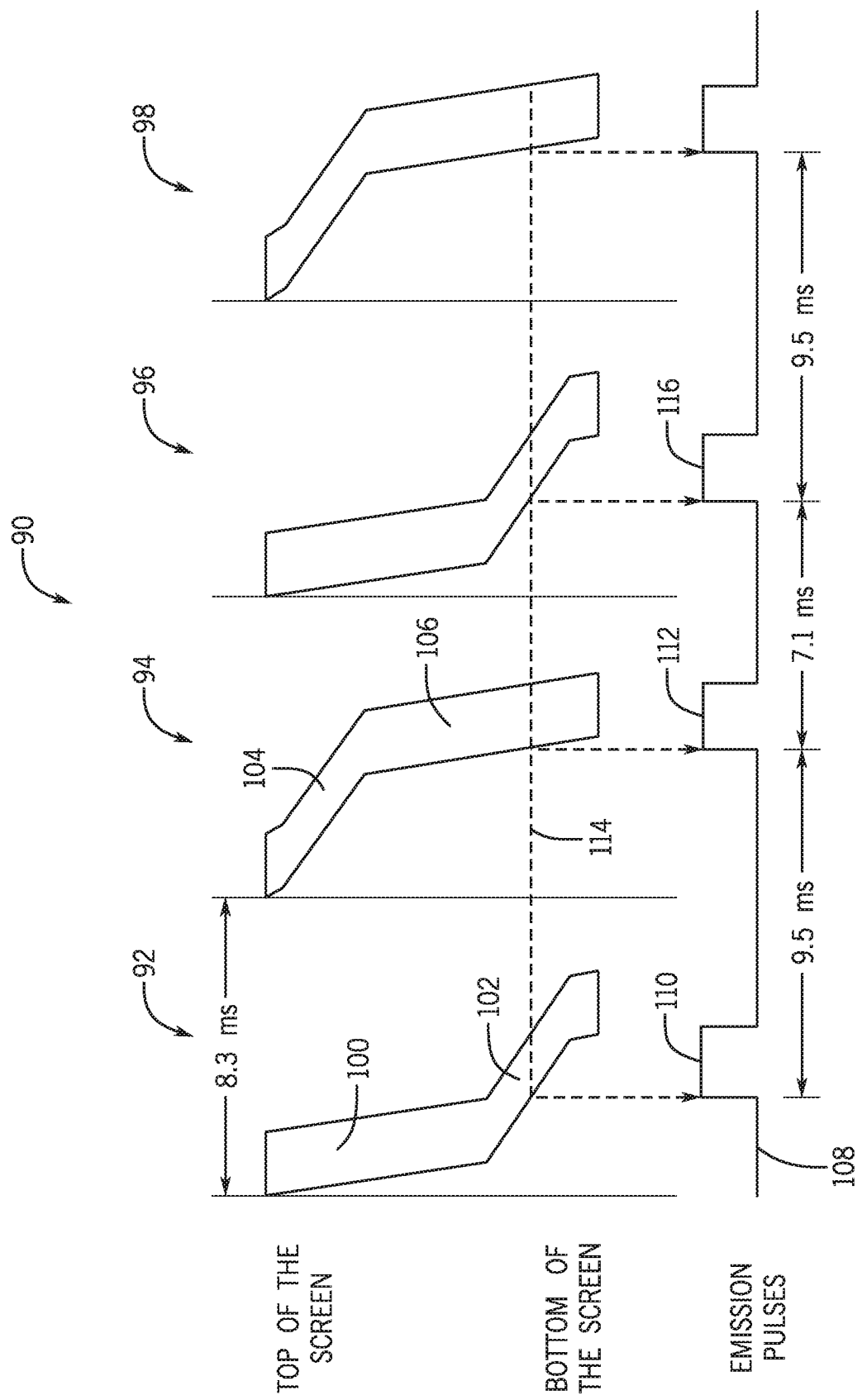
FIG. 8 is a graph illustrating the speed at which lower and higher resolution portions of an image are updated for the display of FIG. 1 during several frames of content, in accordance with an embodiment.

Utilizing dynamic foveation may cause visual artifacts. More specifically, the shifting of the various resolution areas on the display 18 can lead to visual artifacts. FIG. 8 is a graph 90 illustrating the speed at which lower and higher resolution portions of images are updated for the display 18 during a first frame 92 of content, a second frame 94 of content, a third frame 96 of content, and a fourth frame 98 of content. The first frame 92, second frame 94, and third frame 96 respectively correspond to the first frame 72, second frame 74, and third frame 76 of FIG. 7B. For example, as illustrated in FIG. 8, a first portion 100 of the pixels associated with a low resolution portion of the display 18 are updated more quickly than a second portion 102 of pixels that is associated high and medium resolution areas of the display 18. However, during the second frame 74, the high and medium resolution areas of the display 18 are located towards the top of the display 18. Thus, a portion 104 of the pixels takes more time to be updated and displayed than another portion 106 that is associated with a low resolution area of the display 18. Generally speaking, the portions of the display 18 associated with high and medium resolution areas take more time because more data is associated with higher resolution images. Hence, four rows of pixels that are associated with a low resolution image may be processed and displayed four rows at a time, while high/medium resolution areas may be processed and displayed line by line, for example.

The shifting of the high and medium resolution areas across the display 18 as different frames of content are shown can cause a change in strobe cadence between frames. A change in strobe cadence may cause flickering or other visual artifacts to be perceived by the human eye. Line 108 shows emission pulses associated with the display 18. Emission pulses 110 and 112 in the line 108 are representative of times at which the processor core complex 12 sends a command to display content on pixels along a row of the display 18 associated with a line 114, which is positioned relatively near the bottom of the display 18. As shown in FIG. 8, there is a 9.5 millisecond time difference between the emission pulses 110 and 112, and this difference in time is known as a "strobe cadence." For instance, while a strobe cadence of 9.5 milliseconds exists between the emission pulses 110 and 112, a strobe cadence of 7.1 milliseconds is associated with emission pulses 112 and 116. Changes in strobe cadence can occur due to the shifting of the high/medium and low resolution portions of the display 18 that happens during dynamic foveation and the associated differences in the speed at which those portions are updated. For instance, the areas of the display 18 being shown in high/medium and low resolution may change over time based on where the viewer is looking on the display 18, and such changes may cause visual artifacts to occur.

Figure 9A:
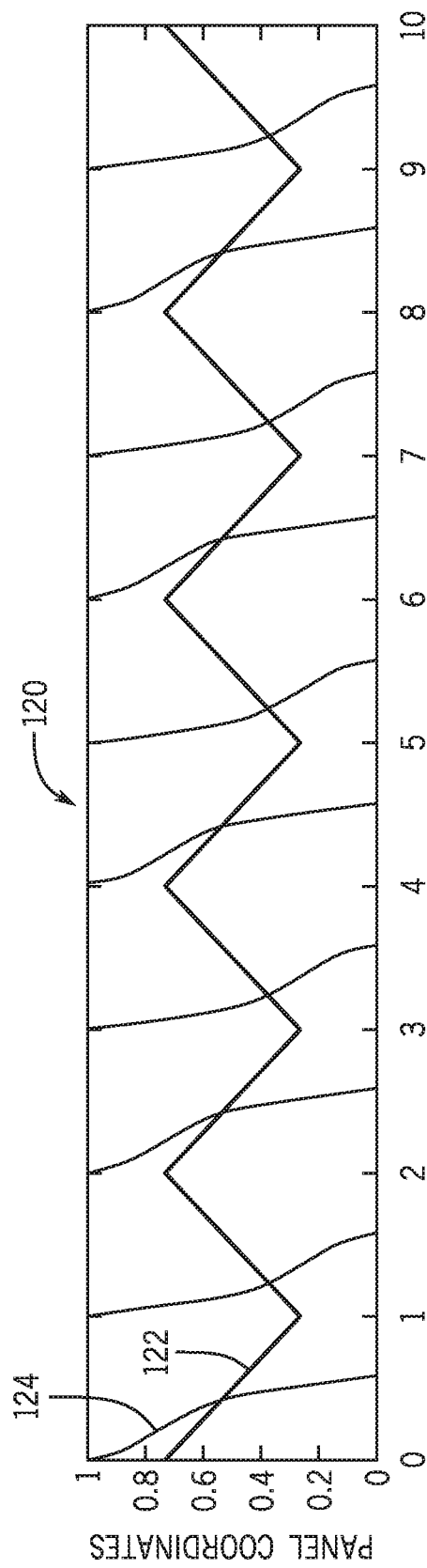
FIG. 9A is a graph illustrating rapid gaze changes across several frames when the viewer's eyes are moving in an extremely rapid manner.
Figure 9B:
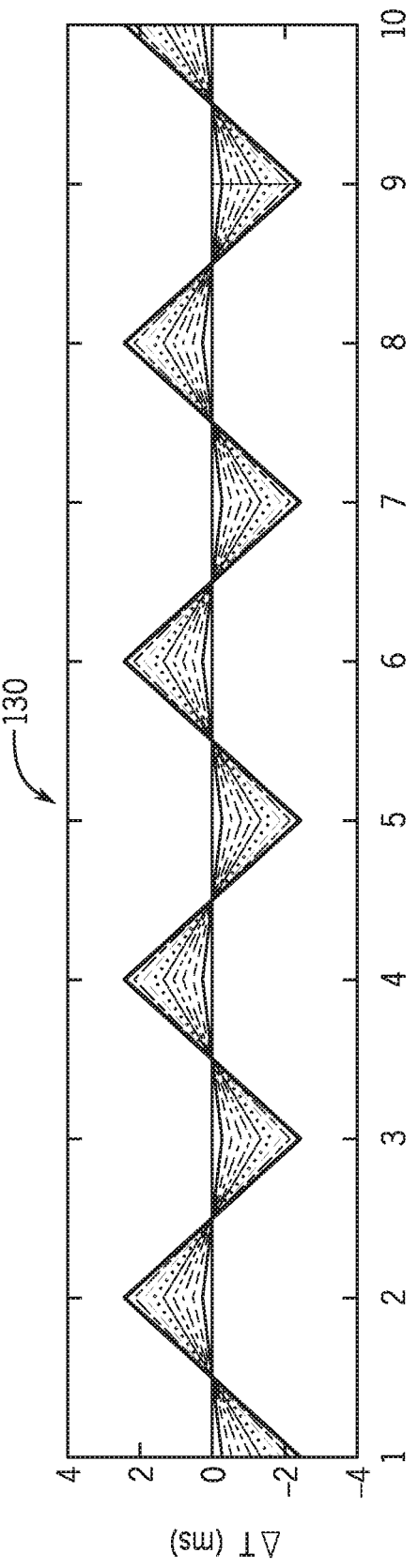
FIG. 9B is a graph showing changes in time between emission pulses associated with the extremely rapid human eye movement illustrated in FIG. 9A.

Indeed, different amounts of eye movement from a viewer may cause varying changes in strobe cadences, and, as described above, changes in strobe cadence may produce visual artifacts. With this in mind, FIG. 9A is a graph 120 that shows rapid gaze changes across several frames when the viewer's eyes are moving in an extremely rapid manner. Line 122 shows the change of the viewer's gaze relative to a vertical position of the display 18. Line 124 and lines like line 124 show how the pixels are loaded (i.e., utilized by the display 18). As illustrated, between each frame, the viewer's gaze shifts by approximately 50% of the height of the display 18. Additionally, the data of graph 120 is associated with a refresh rate of 120 hertz. In other words, the pixels of the display 18 emit light 120 times each second, or once every 8.33 milliseconds. That is, the data of the graph 120 reflects the viewer's eyes moved approximately half of the vertical height of the display 18 every 8.33 milliseconds. As can be discerned from the generally varied patterns formed by line 124 and the lines like line 124, the strobe cadence between frames differs. Indeed, as illustrated in graph 130 of FIG. 9B, the data associated with graph 120 indicates that the strobe cadence may differ by slightly more than 2 milliseconds between frames.

Figure 10A:
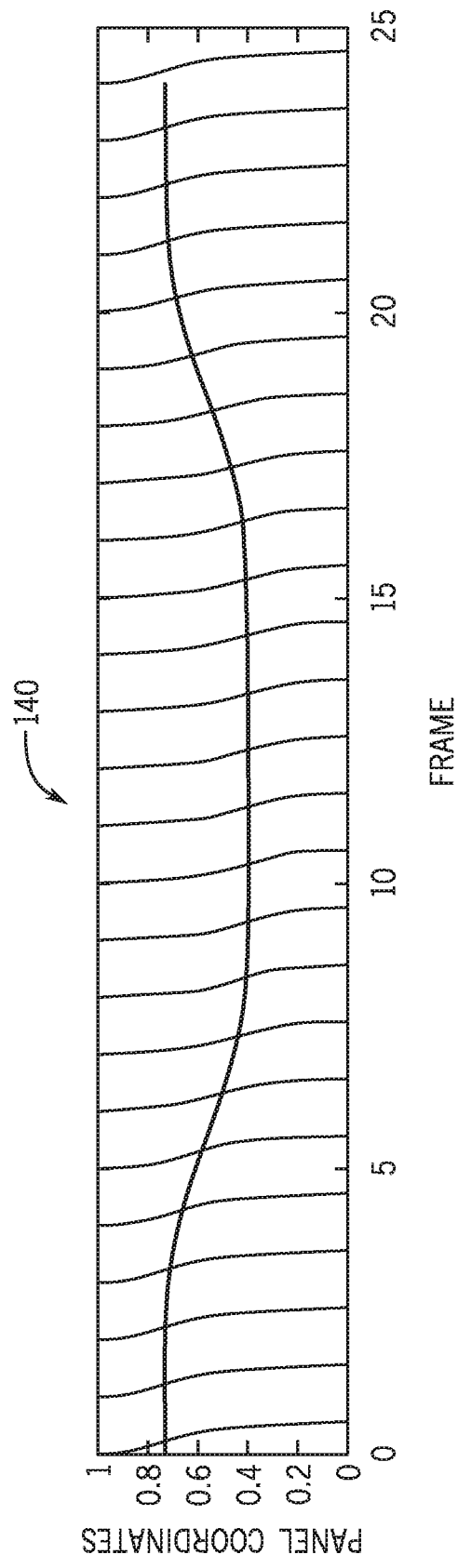
FIG. 10A is a graph illustrating gaze changes across several frames when the viewer's eyes are moving in a typical manner.
Figure 10B:
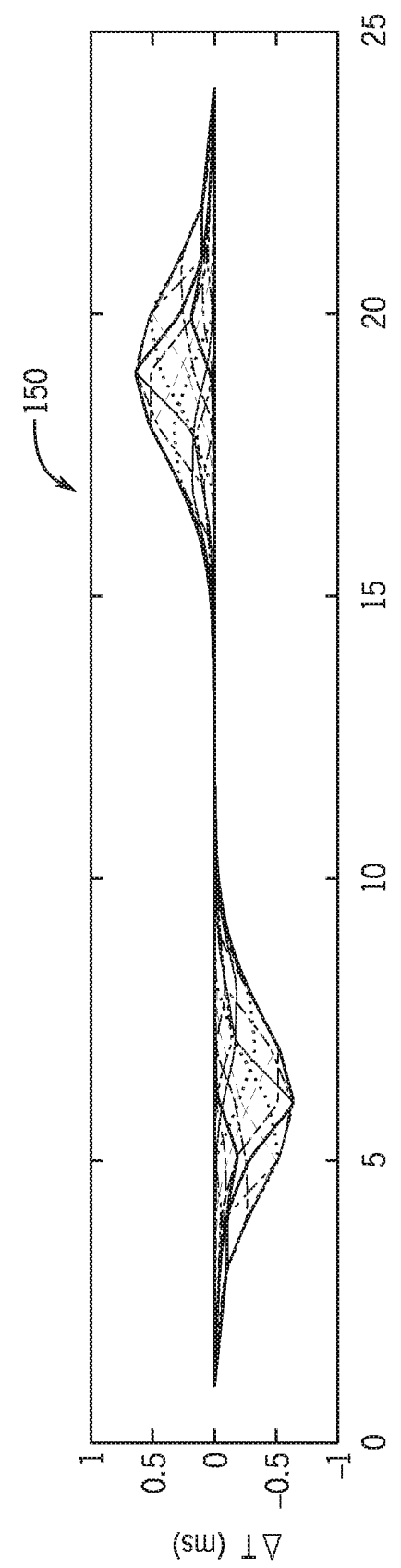
FIG. 10B is a graph showing changes in time between emission pulses associated with the typical human eye movement illustrated in FIG. 10A.

With more typical human eye movement, the vertical position of the display 18 at which the viewer's eyes are focuses occurs more slowly. FIG. 10A shows a graph 140 illustrating changes across several frames when the viewer's eyes are moving in typical manner. As shown by line 142, the viewer's gaze changes over several frames. As can be seen from comparing graph 140 to graph 120, the more gradual change in where the viewer is looking on the display 18 allows for a transition between the high/medium portion and the low resolution portion of the display 18 that appears to occur more fluidly to the human eye. Such a result can be attributed to a lower change in strobe cadence. Indeed, as illustrated in graph 150 of FIG. 10B, the change in strobe cadence was observed to be as high as approximately 0.6 milliseconds. Nevertheless, when the change in strobe cadence is greater than approximately 0.3 milliseconds, the human eye may perceive visual artifacts on the display 18.

Figure 11:
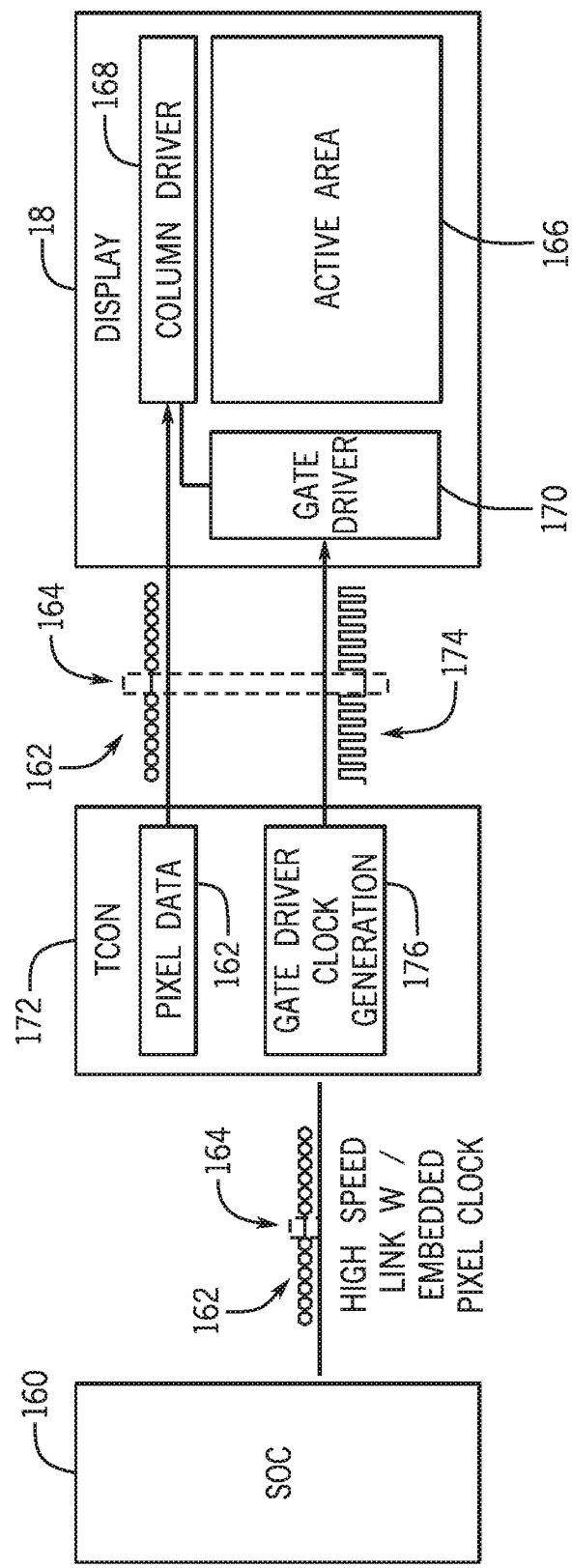
FIG. 11 is a block diagram of a system that implements an intra-frame pause, in accordance with an embodiment.

The occurrence of visual artifacts associated with dynamically foveated displays can be reduced or eliminated by stopping or slowing the transmission of pixel data associated with one or more frames. For instance, stops, or intra-frame pauses, may be performed on pixel data associated frames of content. FIG. 11 provides an overview for how intra-frame pausing may be implemented on the electronic device 10. A system on a chip (SOC) 160 may send pixel data signals 162 that are used by the display 18 to show content on the display 18. The SOC 160 may include several components of the electronic device 10 such as the processor core complex 12, image processing 30, local memory 14, main memory storage device 16, I/O interface 24, network interface 26. Additionally, memory associated with the SOC 160 such as the main memory storage device 16 may include instructions executable by the SOC 160 for when an intra-frame pause 164 should be used. For instance, the SOC 160 may determine an estimated difference in strobe cadence between two frames of content, and the main memory storage device 16 may include a look-up table that describes a length of time for the intra-frame pause based on the estimated difference in strobe cadence. The SOC 160 may then implement that intra-frame pause based on the look-up table. For instance, the look-up table may describe lengths of pauses that, when implemented by the SOC 160, will cause the difference in strobe cadence between frames to be 0.3 milliseconds or less than 0.3 milliseconds. The lengths of the pauses may also be based on changes in positions on the display 18 at which the viewer's eyes are focused.

Before further describing how intra-frame pausing may be implemented, the display 18 will now be discussed in greater detail. As illustrated, the display 18 includes an active area 166 in which images are displayed, a column driver integrated circuit 168, and a gate (row) driver integrated circuit 170. The active area 166 is the area of the display 18 that includes the pixels of the display 18. More specifically, the pixels include light-emitting circuitry, and the active area 166 includes rows and columns of pixels. By way of example, the active area 166 may have a display resolution of 1024×768, which means that each column of pixels includes 768 groups of unit pixels, while each row of the pixel array includes 1024 groups of unit pixels. Each group of unit pixels may include a red, blue, and green pixel or sub-pixel, for example. Thus, each column of pixels may include 2304 pixels or sub-pixels, and each row of pixels may include 3072 pixels or sub-pixels. It should be readily understood, however, that each row or column of the pixel array may include any suitable number of unit pixels, which could include many more than 1024 or 768 pixels.

As mentioned above, the display 18 also includes the column driver integrated circuit 168 and the gate driver integrated circuit 170. The column driver integrated circuit 168, may include a chip, such as a processor or application specific integrated circuit (ASIC), that controls various aspects (e.g., operation) of the electronic display 18 and the active area 166 of the display 18. For example, the column driver integrated circuit 168 may receive the pixel data signals 162 and send corresponding image signals to the unit pixels of the active area 166. The column driver integrated circuit 168 may also be coupled to the gate driver integrated circuit 170, which may provide and remove gate activation signals to activate and deactivate rows of pixels of the display 18.

Returning to the discussion regarding implementing intra-frame pausing, a timing controller 172 may determine and send pixel data signals 162 and timing information signals 174. More specifically, the timing controller 172 may be included in the column driver 168 and receive the pixel data signals 162 from the SOC 160. The timing controller 172 may send the timing information signals 174 to the gate driver integrated circuit 170 via a clock generator 176 to facilitate activation and deactivation of individual rows of pixels of the display 18. For instance, based on a pause indicated by the pixel data signals 162, corresponding pauses may be indicated in the timing information signals 174 such that pixels of the display 18 display the content at a correctly corresponding time. In other embodiments, timing information may be provided to the gate driver integrated circuit 170 in some other manner (e.g., using a controller that is separate from or integrated within the column driver integrated circuit 168).

Further, while FIG. 11 depicts only a single column driver integrated circuit 168, it should be appreciated that other embodiments may utilize multiple column driver integrated circuits 168 to provide pixel data signals 162 and/or timing information signals 174 to the pixels of the active area 166. For example, additional embodiments may include multiple column driver integrated circuits 168 disposed along one or more edges of the active area 166, with each column driver integrated circuit 168 being configured to control a subset of the pixels of the display 18.

Moreover, infra-frame pauses may also be achieved using implementations other than the illustrated embodiment. For instance, the electronic device 10 may not include the SOC 160. In such an embodiment, the processor core complex 12, image processing 30, or the processor core complex 12 and image processing 30 in combination may perform the operations described above as being performed by the SOC 160. For instance, processor core complex 12, image processing 30, or a combination thereof may determine when an intra-frame pause should be implemented (e.g., based on values of a look-up table stored on the main memory storage device 16).

Figure 12A:
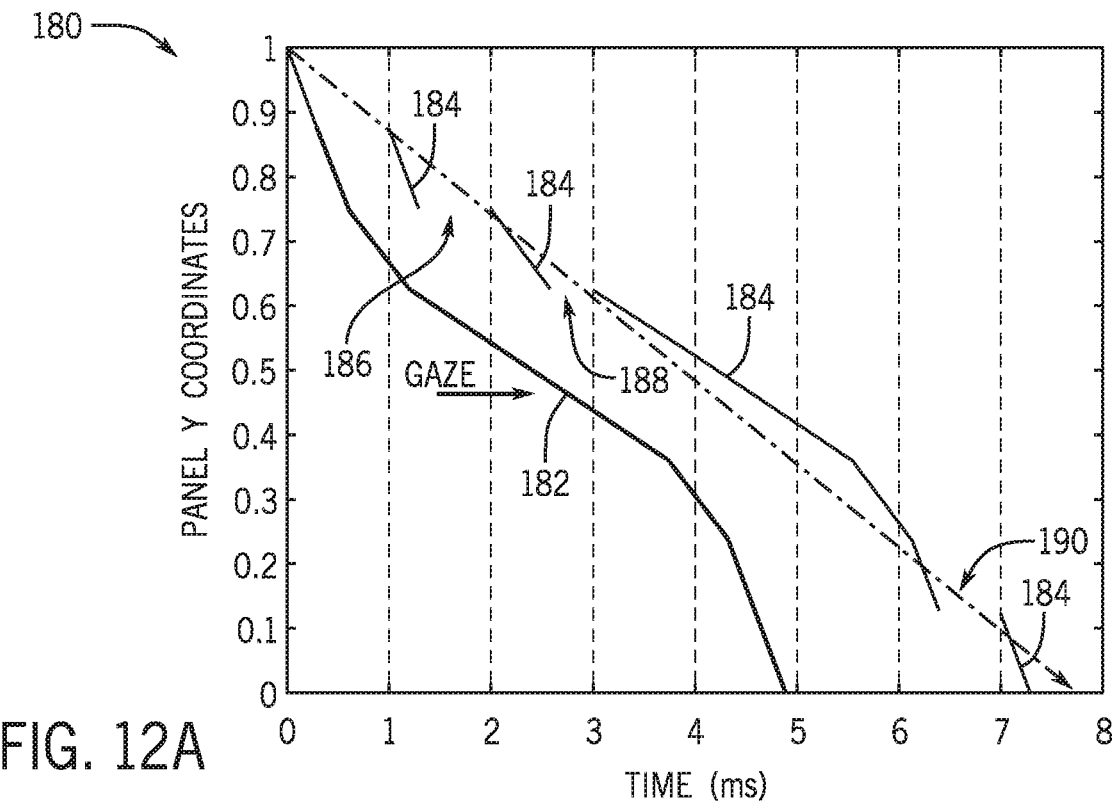
FIG. 12A is an emission profile of pixels of the display of FIG. 1 when intra-frame pausing is implemented, in accordance with an embodiment.
Figure 12B:
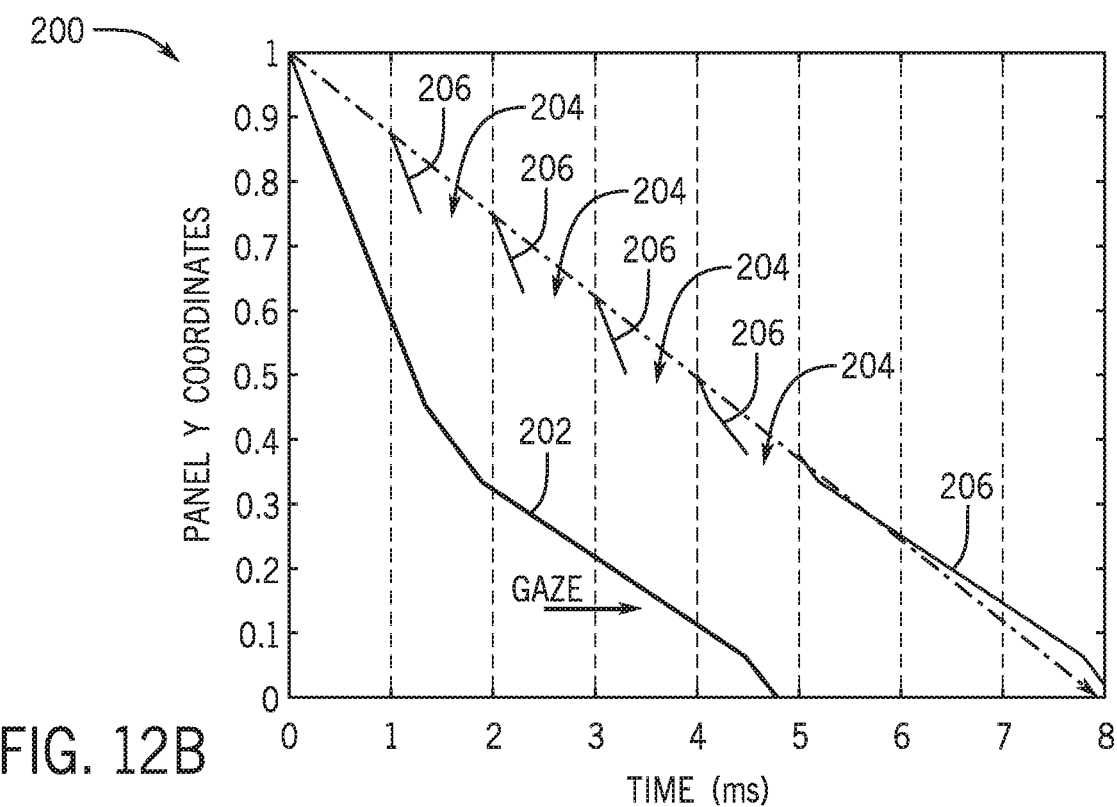
FIG. 12B is another emission profile of pixels of the display of FIG. 1 when intra-frame pausing is implemented, in accordance with an embodiment.

The intra-frame pauses correspond to times when the pixel data signals 162 and timing information signals 174 are stopped, which has the effect of slowing the speed at which lower resolution portions of the image are updated (e.g., portions 100 and 106), thus decreasing changes in the strobe cadence. With this in mind, FIG. 12A and FIG. 12B illustrate emission profiles of pixels of the display 18 in which intra-frame pausing is implemented. Referring specifically to FIG. 12, an emission profile 180 for a frame of content includes a line 182 illustrates a change in vertical position on the display 18 over time of where the viewer's eyes are looking. Line 184 illustrates how the pixels of the display 18 are illuminated over time. Additionally, intra-frame pauses 186, 188, and 190 are shown. As illustrated, the intra-frame pauses 186, 188, and 190 may occur at or around times associated with relatively faster eye movement. That is, intra-frame pausing may be associated with times when the slope of the line 182 is more extreme. Intra-frame pauses 186, 188, and 190 may also be associated with lower resolution portions of the display 18. For instance, when the high and medium resolution portions of the content shown on the display 18 shift due to the viewer's eyes moving, the intra-frame pause may be implemented so that the lower resolution portions may be processed and displayed more slowly, like the high/medium resolution portions. As shown in the emission profile 180, as the rate of change in the viewer's gaze lessens, the intra-frame pausing may not occur. These times are associated with the portion of the display 18 in which the content is shown in high and medium resolutions. Indeed, as the human eye steadies its gaze, the eye can see content more clearly. Thus, the content associated with where the viewer is looking at such a time may be shown high and medium resolutions.

Moreover, the intra-frame pauses may vary in duration. As illustrated, intra-frame pause 186 has a longer duration than intra-frame pause 188. The duration of the intra-frame pauses 186, 188, and 190 may be correlated to the viewer's gaze and/or the difference in speed between updating high/medium resolution portions of content and updating low resolution portions of the content. More specifically, as the viewer's eyes move across the display more rapidly, longer intra-frame pauses may be utilized.

Emission profile 200 of FIG. 12B further illustrates intra-frame pausing. In the illustrated example, line 202 shows a viewer's gaze shift more quickly from one end of the display 18 towards another end of the display 18 than the shift illustrated in FIG. 12A. As shown in FIG. 12B, several intra-frame pauses 204 are included in the line 206, which illustrates pixel emission over time. It should be noted that while there is a larger amount of time between when the viewer's gaze focuses towards the bottom of the display 18 and when the pixels of the bottom of the display 18 are illuminated relative to emission profile 180, such a difference is not discernable to the human eye. For instance, the viewer's gaze is focused towards the bottom of the display 18 for approximately 3.5 milliseconds (i.e., approximately one two-hundred-eighty-fifth of one second) before the pixels at the bottom of the display 18 are illuminated, but this amount of time is not enough time for the human eye to observe that the pixels towards the bottom of the display 18 have not yet been illuminated.

Figure 13A:
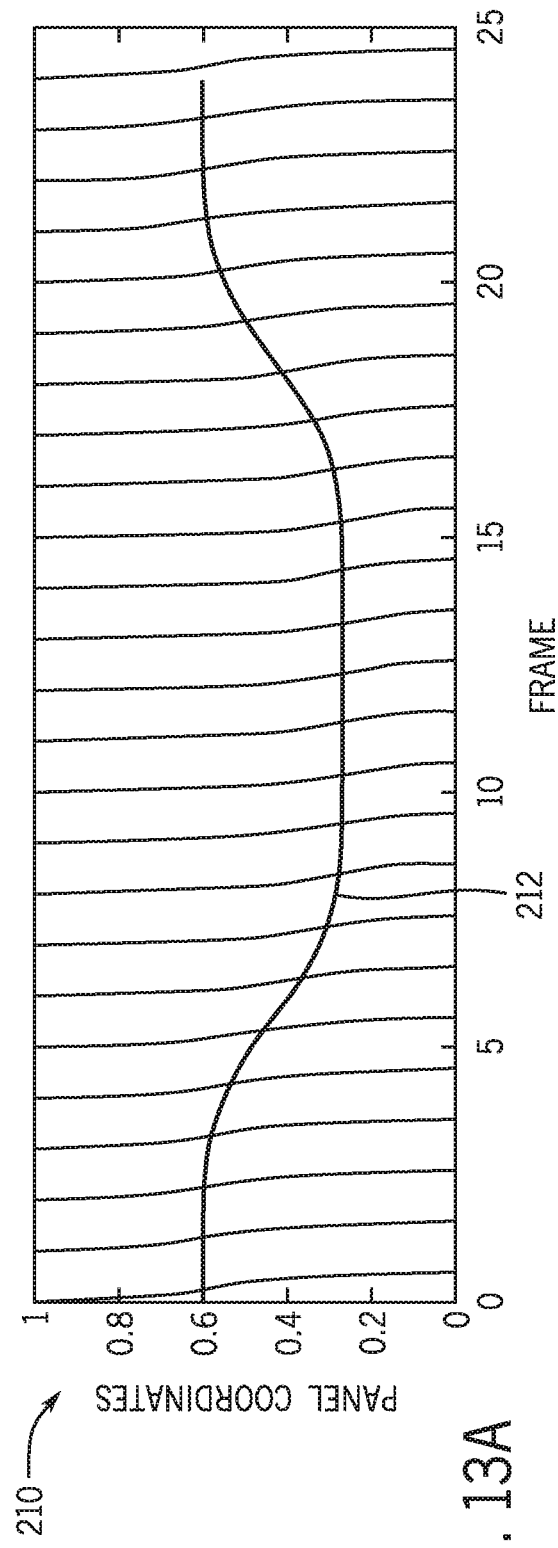
FIG. 13A is a graph illustrating how pixels of various frames are displayed on the display of FIG. 1 when intra-frame pausing is not implemented.
Figure 13B:
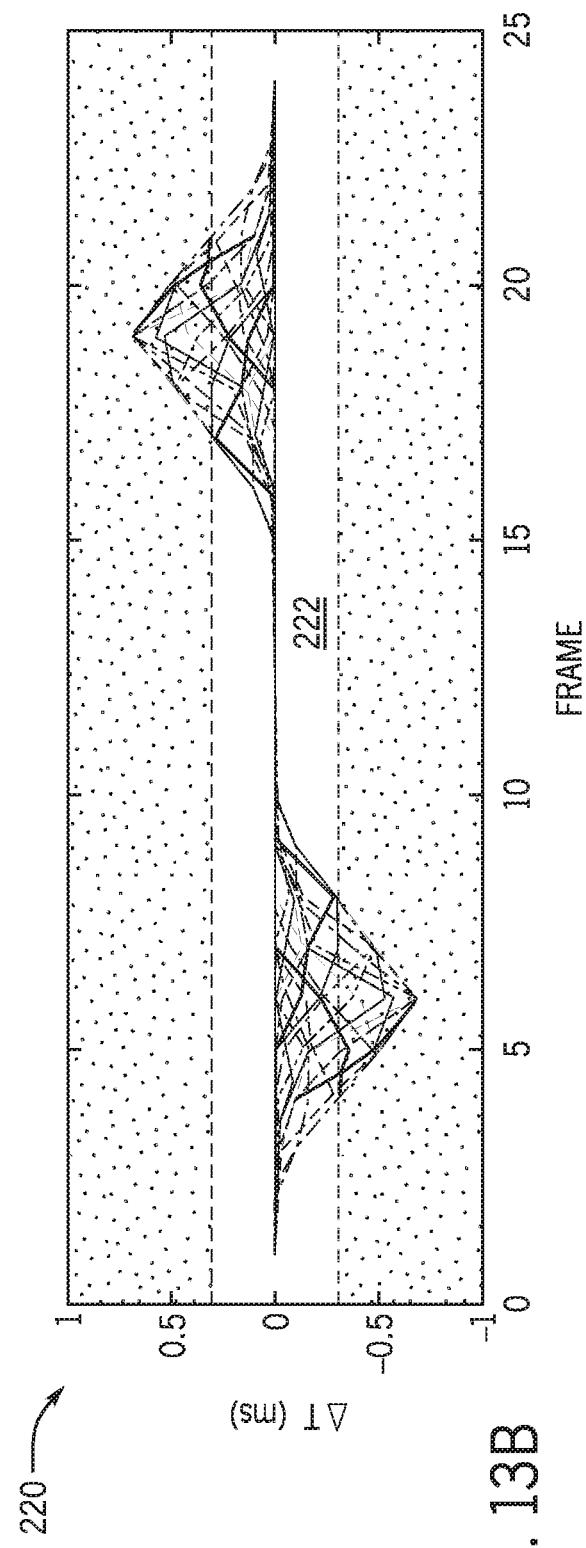
FIG. 13B is a graph showing changes in time between emission pulses of the display of FIG. 1 when intra-frame pausing is not implemented.

Implementing intra-frame pauses also decreases the amount of change in strobe cadence between frames, which reduces or eliminates the occurrence of visual artifacts. To illustrate this, FIG. 13A and FIG. 13B can be compared to FIG. 14A and FIG. 14B, respectively. FIG. 13A shows a graph 210 illustrating how pixels of the display 18 are shown when no intra-frame pausing is performed. Line 212 shows a vertical position of the viewer's gaze over time. FIG. 13B shows a graph 220 that illustrates the change in strobe cadence between the frames of graph 210. The region 222 indicates a range in which the human eye cannot perceive visual artifacts due to changes in strobe cadence. For example, when the change in strobe cadence is less than or equal to approximately 0.3 milliseconds, the human eye cannot perceive any visual artifacts. However, as shown in graph 220, when no intra-frame pause is implemented, changes in strobe cadence that are greater than 0.3 milliseconds are observed.

Figure 14A:
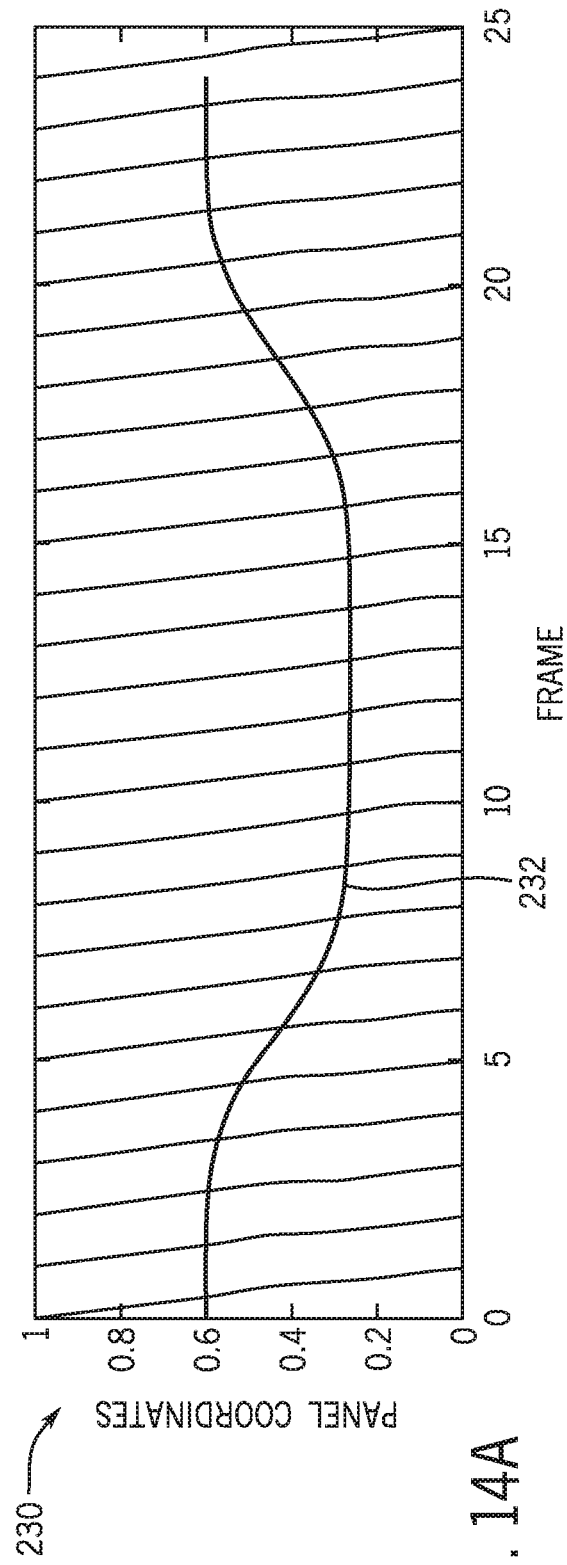
FIG. 14A is a graph illustrating how pixels of various frames are displayed on the display of FIG. 1 when intra-frame pausing is implemented, in accordance with an embodiment.
Figure 14B:
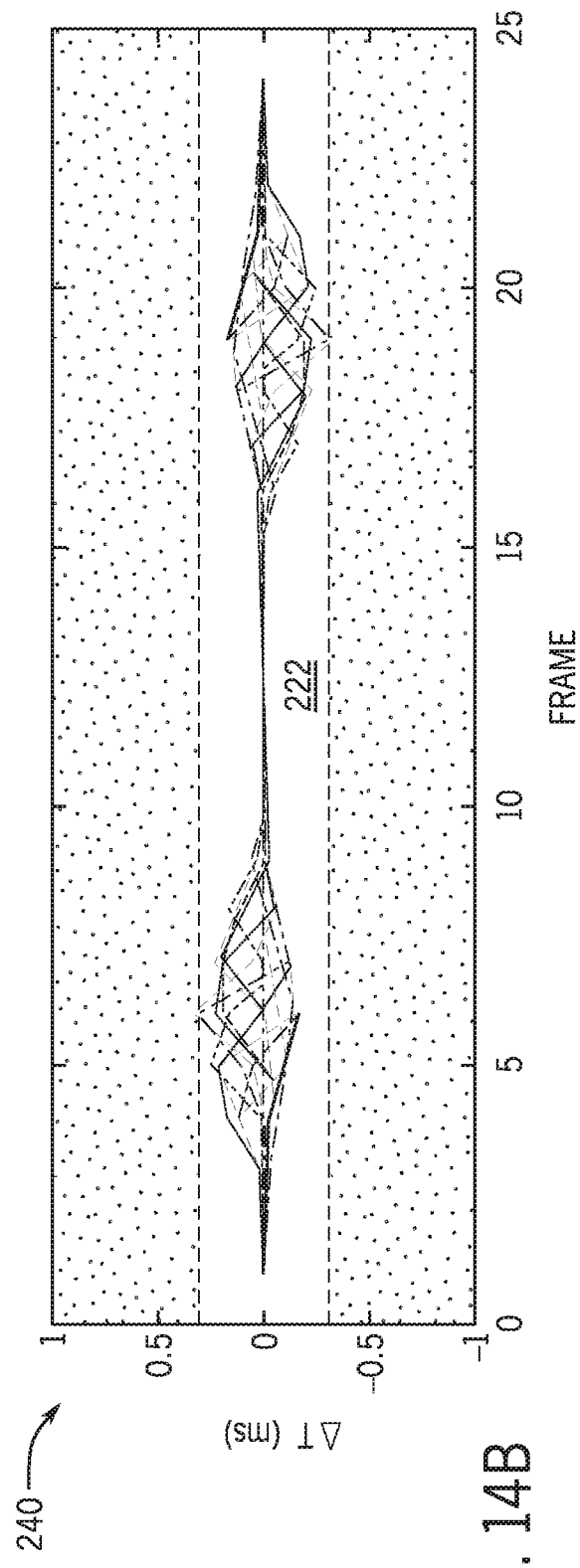
FIG. 14B is a graph showing changes in time between emission pulses of the display of FIG. 1 when intra-frame pausing is implemented, in accordance with an embodiment.

FIG. 14A is a graph 230 that illustrates how pixels of the display 18 are illuminated when intra-frame pausing is implemented. Line 232 shows the same shift in gaze as the line 212 of graph 13A. However, the pixels of each frame are generally illuminated in a more uniform manner from frame to frame compared to when no intra-frame pausing is utilized. Additionally, graph 240 of FIG. 14B shows changes in strobe cadence associated with the frames shown in graph 230. As illustrated, the changes in strobe cadence fall within the region 222, indicating that the change in strobe cadence between frames is equal to or less than approximately 0.3 milliseconds. In other words, intra-frame pausing reduces the changes in strobe cadence to levels that the human eye cannot observe, which reduces and/or eliminates the occurrence of visual artifacts on the display 18.

Figure 15:
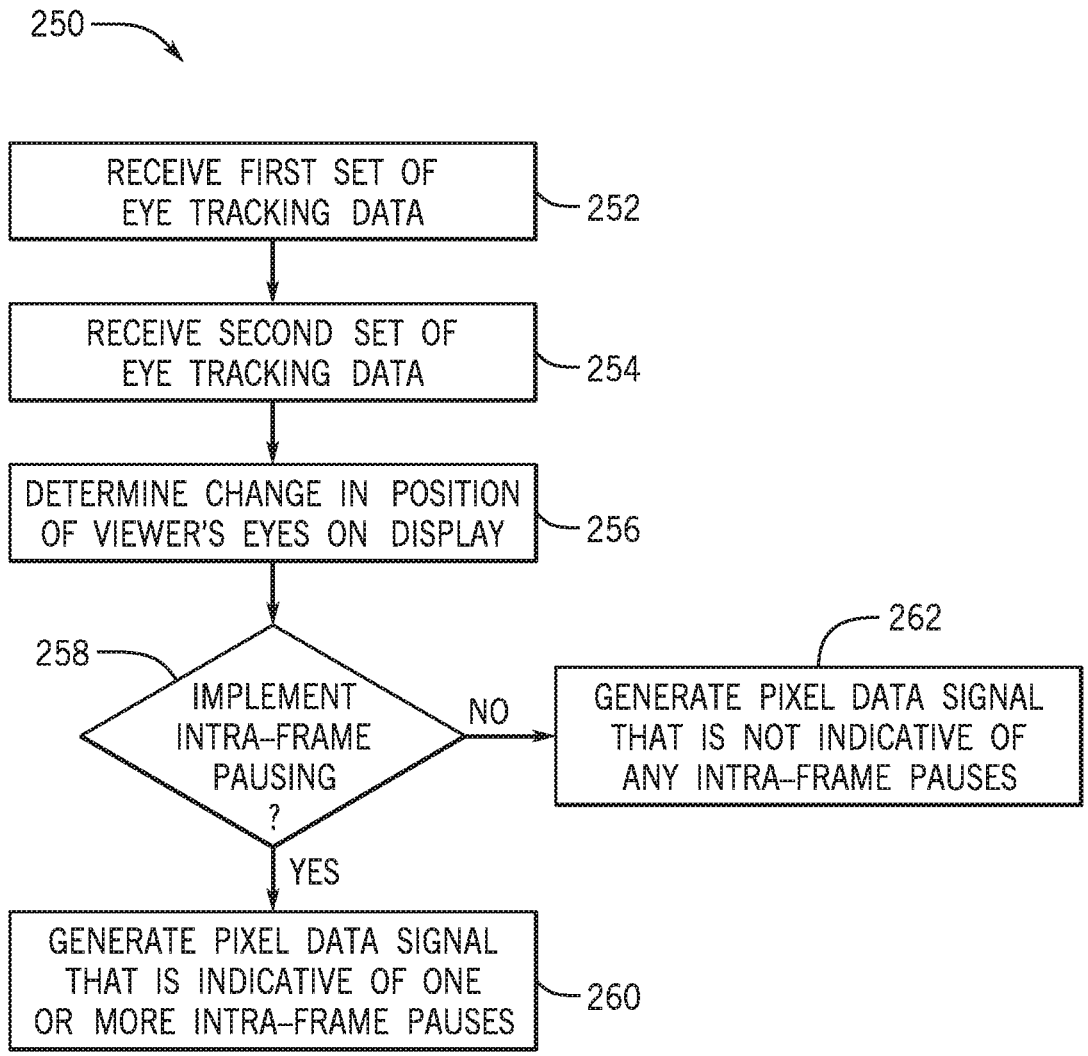
FIG. 15 is a flow chart of a method for implementing intra-frame pausing, in accordance with an embodiment.

FIG. 15 is a flow chart of a method 250 for implementing intra-frame pausing. The method 250 may be performed by the processor core complex 12, video processing 30, SOC 160, a combination thereof, or any suitable processor. Furthermore, while the steps of the method 250 are described below in a particular order, it should be noted that the steps of the method 250 may be performed an order that differs from the order described below.

At block 252, a first set of data regarding where on the display 18 a viewer's eyes are focused at a first time may be received. The data may be obtained and sent via eye tracking components of the electronic device 10. Similarly, at block 254, a second set of data regarding where on the display 18 the viewer's eyes are focused at a second time may be received. Based on the first and second sets of data, at block 256, a change in the position of the viewer's eyes between the first and second times may be determined.

At block 258, whether an intra-frame pause should occur may be determined. For example, whether an intra-frame pause should be used may be determined by accessing a look-up table that may include pause durations associated with a change in a location of the display 18 at which the viewer's gaze is focused. For instance, greater changes in location on the display 18 are associated with greater changes in strobe cadence between frames, and the look-up table may provide an emission profile to utilize so that the pixels of the display 18 will be illuminated in a manner that results in a change in strobe cadence that is approximately 0.3 milliseconds or less.

When it is determined that intra-frame pausing should be conducted, at block 260, a pixel data signal that is indicative of one or more intra-frame pauses (e.g., pixel data signal 162) is generated. However, when it is determine that intra-frame pausing should not be conducted, at block 262, a pixel data signal that is not indicative of an intra-frame pause will be generated. For example, if the location of the display 18 on which the viewer's eyes are focused does not change between frames, it may be determined that intra-frame pausing will not be conducted.

Figure 16:
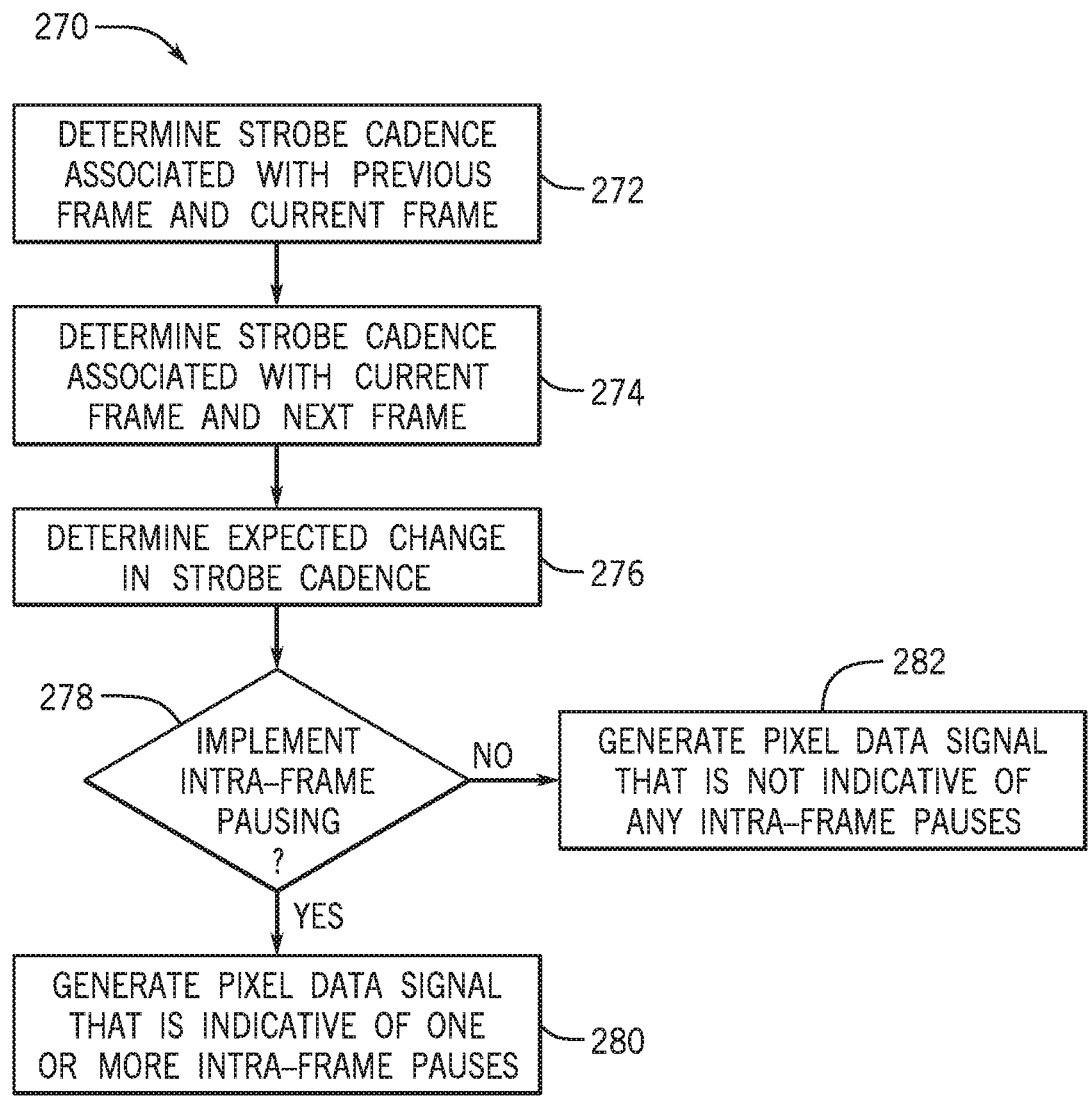
FIG. 16 is a flow chart of another method for implementing intra-frame pausing, in accordance with an embodiment.

Implementing intra-frame pausing may also be conducted based on differences in updating the pixels of the display 18 associated with the high/medium resolution portions and low resolutions of content shown on the display 18. In other words, intra-frame pausing may be implemented based on an expected change in strobe cadence. FIG. 16 is a flow chart of a method 270 for implementing intra-frame pausing in such a manner. The method 270 may be performed by the processor core complex 12, video processing 30, SOC 160, a combination thereof, or any suitable processor. Furthermore, while the steps of the method 270 are described below in a particular order, it should be noted that the steps of the method 270 may be performed an order that differs from the order described below.

At block 272, a strobe cadence associated with a previous frame of content and a current frame (i.e., a frame of content being shown on the display 18) of content may be determined. For example, a row of pixels may have been updated in the frame preceding the current frame at one time, and that same row of pixels may have been updated a certain amount of time afterwards in the current frame. Such a difference may be caused by the high/medium resolution areas and low resolution areas of the display 18 changing between frames (e.g., due to changes in the viewer's gaze), resulting in one row of pixels to be updated at different points in time throughout the duration of the frames.

At block 274, a strobe cadence associated with the current frame and a next frame (e.g., a frame of content immediately after the current frame) may be determined. Such a determination may be made by estimating the time difference between when a row of pixels will be updated when the next frame is displayed compared to when that same row of pixels was updated in the current frame. At block 276, an expected change in strobe cadence may be determined. This may be done by taking the difference of the values determined at block 272 and block 274. At block 278, whether intra-frame pausing should be implemented may be determined. For example, whether intra-frame pausing should be implemented may be determined based on the expected difference in strobe cadence determined at block 276. For example, when the expected strobe cadence exceeds a threshold value, such as approximately 0.3 milliseconds, it may be determined that the strobe cadence should be implemented.

When it is determined that intra-frame pausing should be conducted, at block 280, a pixel data signal that is indicative of one or more intra-frame pauses (e.g., pixel data signal 162) is generated. However, when it is determined that intra-frame pausing should not be conducted, at block 282, a pixel data signal that is not indicative of an intra-frame pause will be generated. For example, if the expected difference in strobe cadence does not exceed the threshold, it may be determined that intra-frame pausing will not be conducted.

Figure 17:
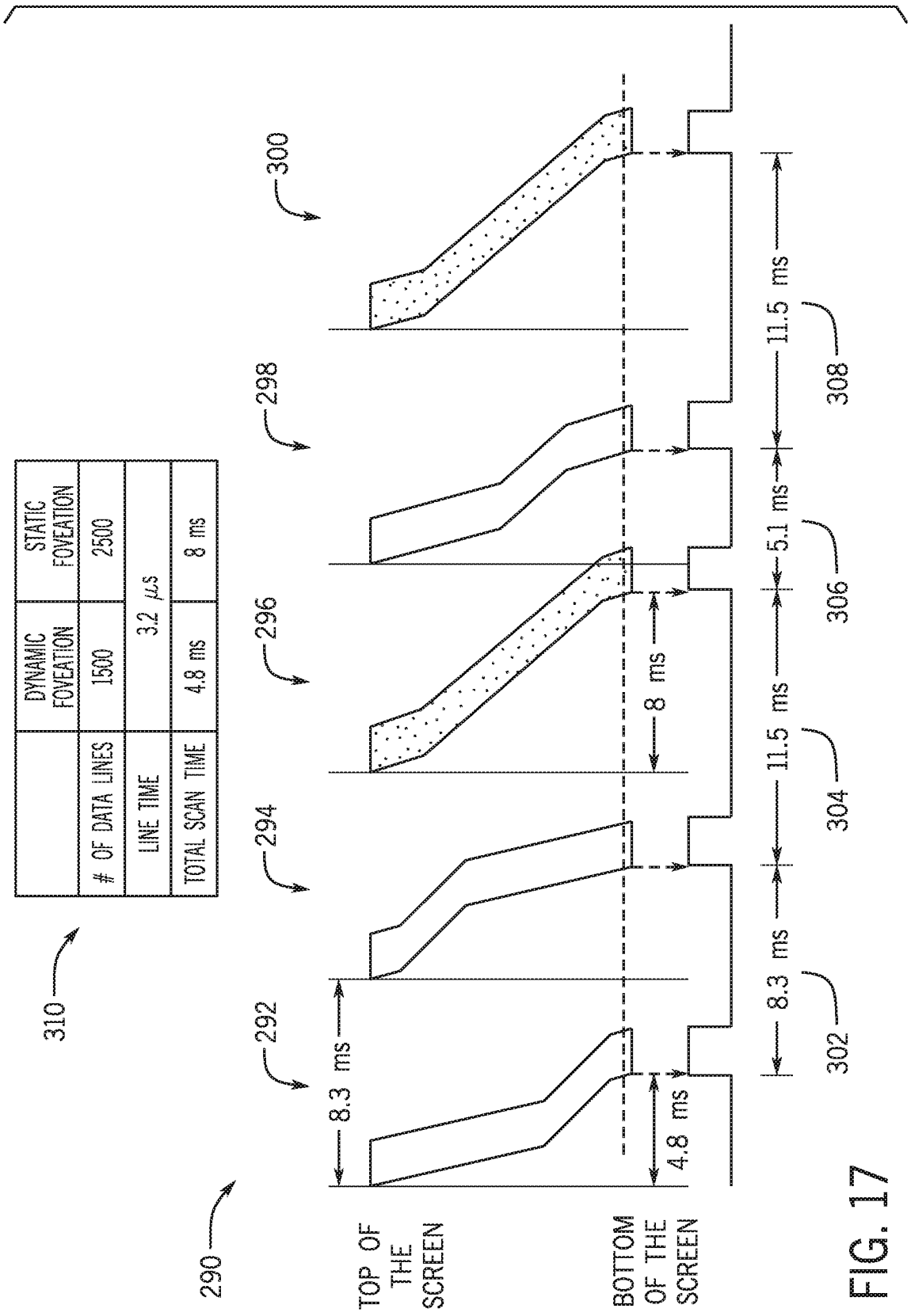
FIG. 17 is a graph showing the speed at which lower and higher resolution portions of an image are updated for the display of FIG. 1 during several frames of content in which the display switches between utilizing dynamic foveation and static foveation, in accordance with an embodiment.

As also described above, visual artifacts may occur due to a loss of tracking of the viewer's eyes. Visual artifacts that occur due to loss of tracking of the viewer's eyes can also be attributable to changes in the amount of time it takes to illuminate columns of pixels of the display. These changes may also cause changes in strobe cadence between frames. FIG. 17 includes a graph 290 illustrating emissions of pixels of the display 18 over time. The graph includes data associated with frames 292, 294, 296, 298, and 300 of content shown on the display 18 that have a duration of 8.3 milliseconds. More specifically, frames 292, 294, and 298 correspond to frames for which eye tracking data was collected, whereas frames 296 and 300 correspond to frames during which eye tracking did not occur. For example, frames 296 and 300 could correspond to times when the viewer had his or her eyes closed.

More specifically, in the illustrated embodiment, the frames 296 and 300 are indicative of static foveation being performed. For example, when the viewer's eyes cannot be tracked, the display 18 may switch from dynamic foveation to static foveation, and the size and location of the foveated regions on the display 18 may change.

Switching between dynamic and static foveation may cause changes in strobe cadence that are large enough to cause visual artifacts that are observable to the human eye. For instance, strobe cadences 302, 304, 306, and 308 of graph 290 show differences of 3.2 milliseconds, 6.4 milliseconds, and 6.4 milliseconds. These differences in strobe cadence may appear to the human eye as flickering or other forms of visual artifacts.

FIG. 17 also includes a table 310 that provides more information regarding the one embodiment of the display 18 and the data shown in the graph 290. When dynamic foveation is performed, 1,500 data lines of pixels are utilized to display the high and medium resolution portions of the display 18, whereas 2,500 data lines of pixels are used when static foveation is performed. Data lines are associated with columns of pixels. For instance, when dynamic foveation is performed, 1,500 columns of pixels of the display 18 may be utilized to show the high and medium resolution portions of the content. Each data line can be processed in 3.2 nanoseconds. Thus, it takes 4.8 milliseconds to utilize the 1,500 data lines that are utilized when dynamic foveation is performed. Additionally, 8.0 milliseconds pass before 2,500 data lines are used when static foveation is performed. When the difference in time between using the data lines of the display 18 differs by more than approximately 3.5 milliseconds, visual artifacts may be observed by the human eye.

To mitigate visual artifacts that may occur from switching between dynamic and static foveation, a more gradual transition from dynamic foveation to static foveation may be utilized. For example, rather than transitioning directly from performing dynamic foveation to performing static foveation when a loss of eye tracking occurs, a transition from dynamic foveation to static foveation may occur over several frames. More specifically, the resolution of the display 18 is gradually increased frame by frame. For instance, while 1,500 data lines are utilized when dynamic foveation is being performed on the display 18, 1,600 data lines may be utilized at a next frame, 1,700 data lines may be utilized at a frame after that. That is, 100 more data lines or columns of pixels may be used in each subsequent frame until 2,500 data lines are used, marking the completion of the transition from dynamic foveation to static foveation. Because 100 more data lines are utilized for the high and/or medium resolution portions of the display per frame and each data line can be utilized in 3.2 nanoseconds, adding 100 more data lines to a subsequent frame results in an increase of 0.32 milliseconds in the amount of time it takes to utilize the data lines. This same amount of time would also be observed in the change in strobe cadence between the frames of content during the gradual transition to using static foveation. Moreover, this amount of time is small enough to be unperceivable to the human eye. Thus, the occurrence of visual artifacts can be reduced and/or eliminated by gradually transitioning from employing dynamic foveation to employing static foveation over a larger portion of the display 18.

While the transition from dynamic foveation to static foveation is described as occurring 100 data lines more per frame of content, it should be noted that different amounts of data lines may be used. For instance, the transition to static foveation may occur 50 data lines per frame but over more frames. That is, the transition can be even more gradual. Additionally, the transition may occur more quickly. In other words, more than an additional 100 data lines may be utilized per frame. However, it should be noted that visual artifacts may occur when the change in time used to utilize the data lines of two frames differs by more than approximately 0.35 milliseconds.

Additionally, while the transition is described as going from dynamic foveation to static foveation, the transition may also occur from static foveation back to dynamic foveation. For instance, if a viewer of the display 18 were to close his or her eyes for an amount of time equal to or greater than the duration of ten frames, a full transition from dynamic foveation to static foveation may occur. However, upon the viewer opening his or her eyes, eye tracking may resume, and the display 18 may gradually transition over several frames back to utilizing dynamic foveation with 1,500 data lines of the display 18.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
   a display;
   an eye tracker configured to collect eye tracking data regarding a gaze of one or more of a user's eyes across the display; and
   processing circuitry operatively coupled to the display and configured to:
   receive the eye tracking data;
   generate pixel data for each frame of a plurality of frames of content based on the eye tracking data, wherein each frame of the plurality of frames comprises a high resolution portion and a low resolution portion, the high resolution portion being associated with a first region of the display and the low resolution portion being associated with a second different portion of the display; and
   generate one or more intra-frame pauses for pixel data associated with the low resolution portion to maintain a strobe cadence between successive frames of the plurality of frames such that the display does not generate visual artifacts perceivable by the user's eyes, wherein the strobe cadence corresponds to a duration of time between when a row of pixels of the display begins to show content in a first and second frame of the successive frames.

2. The electronic device of claim 1, wherein the one or more intra-frame pauses correspond to one or more times within a single frame when the display is configured to not show content.

3. The electronic device of claim 1, wherein the processing circuitry is configured to generate the one or more intra-frame pauses such that a first strobe cadence associated with two of the successive frames differs from a second strobe cadence associated with one of the two successive frames and another frame of the plurality of frames by 0.3 milliseconds or less.

4. The electronic device of claim 1, wherein the processing circuitry is configured to generate the one or more intra-frame pauses based on the eye tracking data.

5. The electronic device of claim 4, wherein:
   a first portion of the eye tracking data corresponds to a first location of the display at which the user is looking at a first time;
   a second portion of the eye tracking data corresponds to a second location of the display at which the user is looking at a second time; and
   the processing circuitry is configured to generate the one or more intra-frame pauses based on a difference between the first and second locations of the display.

6. The electronic device of claim 5, wherein the difference between the first and second locations of the display corresponds to a change along one dimension of the display.

7. An electronic device, comprising:
   a display;
   an eye tracker configured to collect eye tracking data regarding a gaze of one or more of a user's eyes across the display; and
   processing circuitry operatively coupled to the display and configured to:
   receive the eye tracking data; and
   generate pixel data for each frame of a plurality of frames of content based on the eye tracking data such that the display is configured to transition from showing the content in a dynamically foveated manner to showing the content in a statically foveated manner such that the display does not generate visual artifacts perceivable by the user's eyes, wherein:
   showing the content in the dynamically foveated manner is based on the eye tracking data; and
   showing the content in the statically foveated manner is independent of the user's gaze.

8. The electronic device of claim 7, wherein the display is configured to transition from showing the content in the dynamically foveated manner to showing the content in the statically foveated manner such that a first strobe cadence associated with a first frame and second frame of the plurality of frames differs from a second strobe cadence associated with the second frame and a third frame of the plurality of frames by 0.35 milliseconds or less.

9. The electronic device of claim 7, wherein at least a portion of the eye tracking data is indicative of the eye tracker losing track of the user's gaze.

10. The electronic device of claim 9, wherein the processing circuitry is configured to generate pixel data for each frame of a portion of the plurality of frames associated with the transition from dynamic foveation to static foveation upon receiving the at least a portion of the eye tracking data.

11. The electronic device of claim 7, wherein the electronic device comprises a computer, a mobile phone, a portable media device, a tablet, a television, or a virtual-reality headset.

12. The electronic device of claim 7, wherein the plurality of frames comprises at least ten frames.

13. The electronic device of claim 7, wherein the processing circuitry is configured to:

cause the display to display high resolution content using a first number of lines of pixels of the display when displaying the content in the dynamically foveated manner; and cause the display to display the high resolution content using a second number of lines of pixels that is greater than the first number of lines of pixels.

14. The electronic device of claim 7, wherein the processing circuitry is configured to transition from showing the content in the dynamically foveated manner to showing the content in the statically foveated manner while maintaining a strobe cadence between successive frames of the plurality of frames such that the display does not generate visual artifacts perceivable by the user's eyes, wherein the strobe cadence corresponds to a duration of time between when a row of pixels of the display begins to show content in a first frame and second frame of a plurality of successive frames.

15. An electronic device comprising:
a display;
an eye tracker configured to collect eye tracking data regarding a gaze of one or more of a user's eyes across the display; and
processing circuitry operatively coupled to the display and configured to:
receive the eye tracking data;
generate pixel data for each frame of a plurality of frames of content based on the eye tracking data such that the content is configured to be shown on the display in a dynamically foveated manner; and
generate one or more intra-frame pauses for the pixel data such that a first strobe cadence associated with a first frame and second frame of the plurality of frames differs from a second strobe cadence associated with the second frame and a third frame of the plurality of frames by 0.3 milliseconds or less, wherein:
the first strobe cadence corresponds to a first duration of time between when a row of pixels of the display begins to show content in the first frame and second frame; and
the second strobe cadence corresponds to a second duration of time between when the row of pixels of the display begins to show content in the second frame and the third frame.

16. The electronic device of claim 15, wherein the first frame immediately precedes the second frame, and the second frame immediately precedes the third frame.

17. The electronic device of claim 15, wherein the processing circuitry is configured to generate the one or more intra-frame pauses based on a change in the user's gaze.

18. The electronic device of claim 15, wherein the processing circuitry is configured to generate the one or more intra-frame pauses in the third frame when an expected change in strobe cadence relative to the first strobe cadence exceeds a threshold.

19. The electronic device of claim 18, wherein the threshold corresponds to a value of 0.3 milliseconds.

20. The electronic device of claim 18, wherein the processing circuitry is configured to determine the expected change in strobe cadence based on the eye tracking data.

* * * * *